United States Patent [19]

Ammann

[11] Patent Number: 5,436,768

[45] Date of Patent: Jul. 25, 1995

[54] LASER BEAM RECEIVERS

[75] Inventor: Hans-Rudolf Ammann, Amriswil, Switzerland

[73] Assignee: Ammann Lasertechnik AG, Switzerland

[21] Appl. No.: 88,210

[22] Filed: Jul. 2, 1993

[30] Foreign Application Priority Data

Jul. 6, 1992 [CH] Switzerland .............. 02129/92

[51] Int. Cl.⁶ ............................................ G01B 11/26
[52] U.S. Cl. .................................. 359/838; 359/726; 359/839; 356/153
[58] Field of Search ............... 359/838, 872, 839, 728, 359/565, 234, 235; 356/153, 154, 138

[56] References Cited

U.S. PATENT DOCUMENTS

| | | | |
|---|---|---|---|
| 3,631,601 | 1/1972 | McNulty | 356/153 |
| 3,870,816 | 3/1975 | Mason | 359/234 X |
| 3,907,435 | 9/1975 | Roodvoets | 356/153 |
| 4,061,426 | 12/1977 | Jamison | 356/153 |
| 4,111,564 | 9/1978 | Trice, Jr. | 356/153 |
| 4,290,670 | 9/1981 | Gerber | 359/235 |
| 4,764,002 | 8/1988 | Wilson | 359/872 |
| 5,245,619 | 9/1993 | Kronberg | 359/565 |

FOREIGN PATENT DOCUMENTS

| | | | |
|---|---|---|---|
| 0172316 | 7/1987 | Japan | 359/234 |
| 0174010 | 7/1988 | Japan | 359/234 |

Primary Examiner—Joseph A. Popek
Assistant Examiner—Son Dinh
Attorney, Agent, or Firm—Nies, Kurz, Bergert & Tamburro

[57] ABSTRACT

A laser beam receiver including a transparent disc and a mirror arrangement which are fastened on a base element. A light spot formed on the disc by a laser beam may only be seen optimally, particularly if the distance between the laser device and the laser beam receiver is so great that the laser beam arrives only faintly, if the observer's angle of view lies in the axial extension of the laser beam. The mirror is so arranged that this angle of view lies exactly in the axial extension of the laser beam. The range of action of the laser device is thus expanded in a simple and inexpensive manner.

7 Claims, 2 Drawing Sheets

LASER BEAM RECEIVERS

FIELD OF THE INVENTION

This invention relates to a laser beam receiver for a canal building laser device.

BACKGROUND OF THE INVENTION

Known laser beam levelling devices serve to determine a horizontal or an inclined plane and are used for building purposes. The laser beam issuing from the device is received at a relatively great distance by a receiver. The inclination of the imaginary plane between the laser beam device and the receiver may therefore be measured. Laser beam levelling devices are used, for example, in ground excavation and the grading of pits, in the monitoring of concrete foundations and concrete ceilings, orientation of formwork, in the levelling of tracks for building cranes and much more.

Canal building laser devices are a subgenus of laser beam levelling devices. They are used in the construction of pipelines, for example of drainage pipes, in order to lay the individual lengths of pipe in the desired inclination and direction. The lengths of pipe are lined up until they form a pipeline having an inclination of, for example, 1.2%. Shafts are installed at intervals; there is no change of direction between the shafts. The inclination of the individual portions of pipeline between the shafts has to differ in each case in practice.

During the construction of a pipeline, the canal building laser device is erected at the beginning of a line, i.e. normally in the region of a shaft, such that the laser beam points in the desired direction and has the desired inclination. The laser beam therefore indicates both the direction and the inclination in which the pipeline is to be constructed. The receiver is inserted at the opposite end of the length of pipe to be positioned. The receiver usually has a transparent disc with markings in the form of a reticule. The laser beam issuing from the canal building laser device strikes the disc of the receiver as a spot of light. As soon as this spot of light is located in the centre of the reticule, the length of tube is correctly positioned and may be fastened in this position.

The formerly known canal building laser devices contain helium neon laser tubes producing a laser beam which is visible up to a distance of 100 m depending on the optical system concentrating the laser beam.

So-called laser diodes have also recently become available. They have the advantage that they consume far less power than conventional helium neon laser tubes. Former canal building laser devices are assigned an external power source owing to the high energy consumption of the laser tubes. Furthermore, laser diodes are much smaller in their dimensions, so the overall size of the laser devices could be smaller, making them suitable for the construction of smaller diameter pipelines. The former canal building laser devices are suitable for pipelines having diameters of at least 150 mm. A drawback is that the laser beam of the formerly available laser diodes is visible only up to 40 or at most 50 m.

A further drawback is that the light spot formed by the laser beam on the transparent disc of the receiver can only be seen optimally on the side to be turned away from the laser beam—at the location of the device operator—if the angle of view is approximately in the axis of the arriving laser beam. The steeper this angle of view, the more difficult it is to see the light spot. If the distance between the canal building device and the receiver is too great, the light spot is no longer visible even if there is only a slight deviation between the angle of view and the laser beam axis. As the receiver is to be arranged in the pipe located on the bottom of a pit, the practical range of action of the canal building laser device is reduced considerably if the device operator does not lower himself onto the possibly muddy bottom of the pit in order to observe the light spot.

SUMMARY OF THE INVENTION

The object of the present invention is to provide a laser beam receiver for a canal building laser device which allows the laser beam arriving from the canal building device to be made easily visible even over a prolonged distance.

According to the invention, there is provided a laser beam receiver for a canal building laser device, said receiver having a transparent disc adapted to receive a laser beam from the canal building laser device, wherein a mirror arrangement is disposed behind the transparent disc such that a light spot formed by the laser beam on the side of the disc facing away from the laser beam is visible in the mirror.

Owing to the disposition of a mirror arrangement, work with the laser beam receiver may be made more convenient and the range of action of the canal building laser device may be considerably expanded. In particular, canal building laser devices which are equipped with laser diodes and were formerly unsuitable for the construction of pipelines having relatively great shaft intervals owing to their excessively small range of action may easily be made suitable for use in longer portions of pipeline. It has been found during practical experiments that, owing to the use of the laser beam receiver according to the invention, the laser diode canal building laser devices may be used for the ranges of action which are desired nowadays but could formerly be overcome only with the less convenient laser tube canal building laser devices. A great effect may therefore be achieved with minimal use of materials and costs.

BRIEF DESCRIPTION OF THE DRAWINGS

The invention will now be described in detail, by way of example, with reference to the drawings, in which.

DESCRIPTION OF A PREFERRED EMBODIMENT

Figure 1:
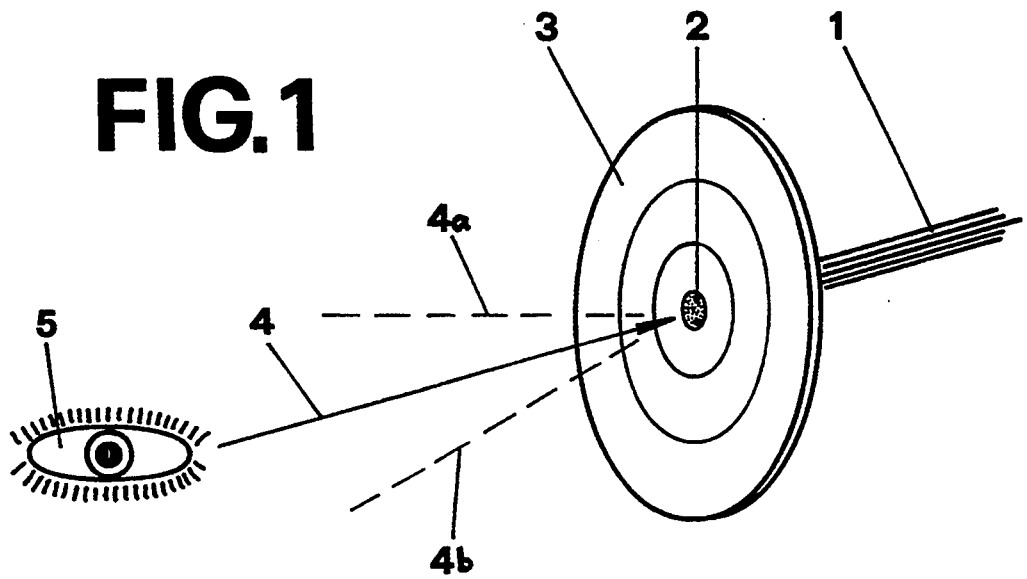
FIG. 1 shows the problem of the angle of view on the disc of a laser beam receiver.

FIG. 1 shows how a laser beam 1 arriving from a canal building laser device is visible as a light spot 2 on the side of a disc 3 of a laser beam receiver on the side facing away from the laser beam 1, i.e. on the side facing toward a person working with the laser beam receiver. This light spot 2 can be seen best if the angle of view 4 is located exactly at the axis of the laser beam 1, that is when the eye 5 is located in the extension of the axis of the arriving laser beam 1. As soon as the angle of view is removed in one or other direction from this optimum angle of view, as indicated by 4a or 4b, the light spot 2 becomes less visible until it disappears completely. If the light spot 2 glows only faintly owing to the great distance between the canal building laser device and the laser beam receiver, it can only be detected, if at all, if the angle of view 4 is located exactly in the extension of the axis of the laser beam 1.

Figure 2:
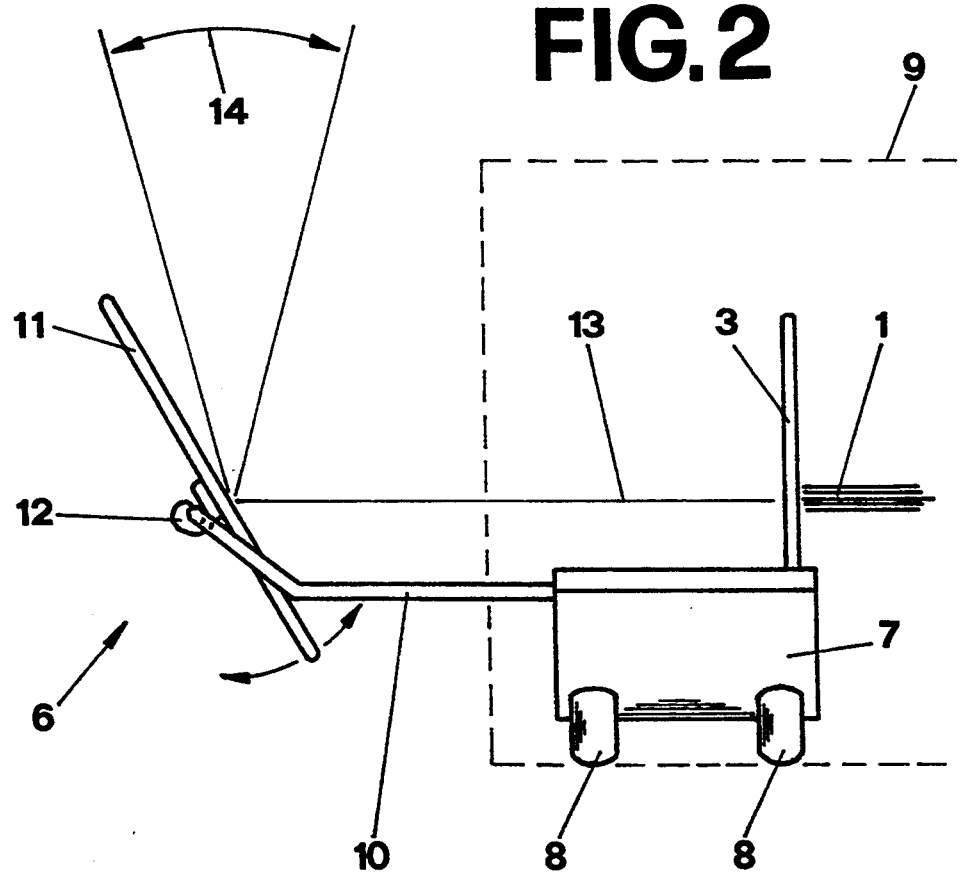
FIG. 2 is a side view of one embodiment of a laser beam receiver according to the invention.

According to FIG. 2, the laser beam receiver in accordance with the present invention includes the transparent disc 3 which, as known, may be provided with a reticule or with concentric circles, and also includes a mirror arrangement 6. These components are fastened on a base element 7 which is equipped with feet 8 so that it may be erected in the pipe cross section at the end of a pipeline 9. The mirror arrangement 6 consists of a U-shaped mounting 10 and a mirror 11 arranged thereon. The free longer U arms of the mounting 10 are placed in corresponding openings in the base element 7. To enable the mirror 11 to be held at the correct height in the extension of the axis of the laser beam 1, the mounting 10 is bent upwardly. The mirror 11 is fastened pivotally and detachably on the mounting 10 by means of clips 12. The mirror 11 is advantageously shatter resistant and as insensitive as possible to scratches. A mirror of chromium-plated metal is particularly suitable for this purpose. The mirror 11 ensures that the angle of view onto the disc 3 is located exactly in the axial extension 13 of the laser beam 1. The mirror 11 should be pivoted, particular if the light spot 2 is only faintly visible, such that the observer's view falls at the optimum angle on the mirror so that the light spot 2 can be seen optimally.

Figures 3A, 3B:
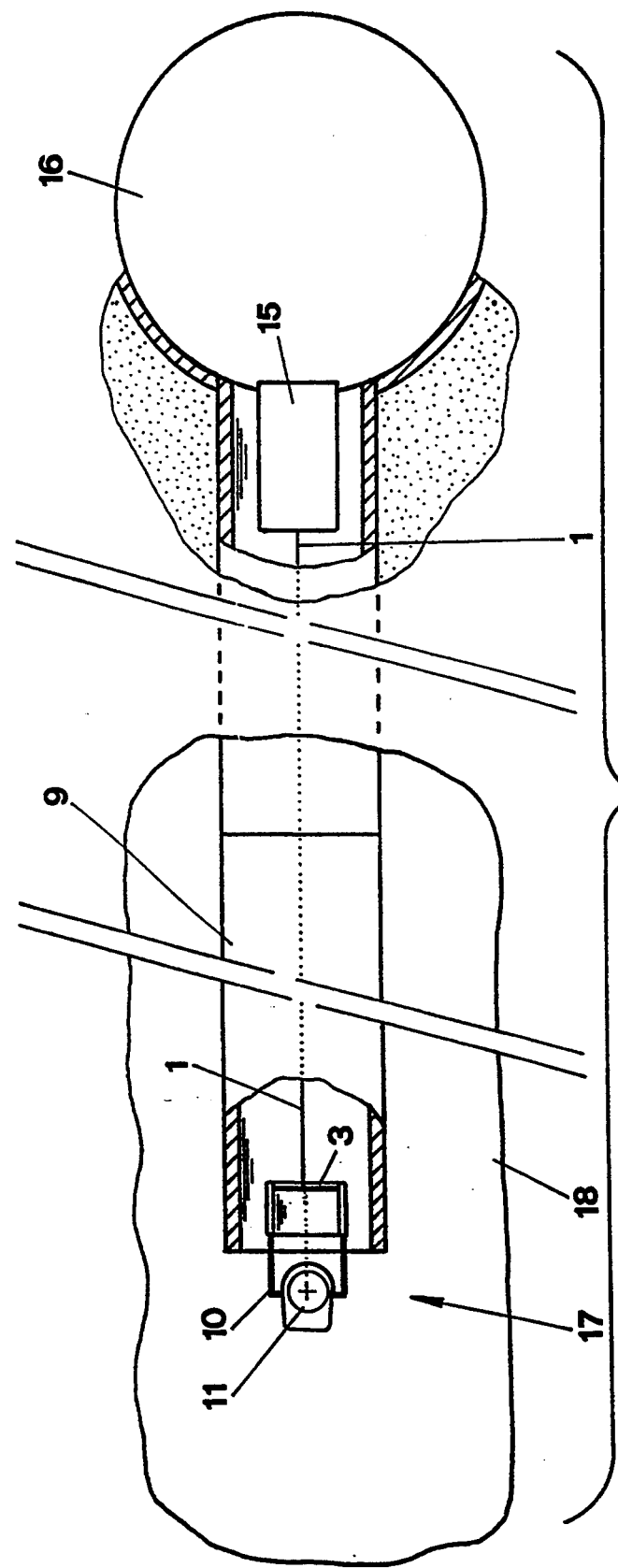
FIG. 3A is a fragmentary elevational view, partially in section, showing the orientation of a reflecting mirror.
FIG. 3B is a top view that shows how the laser beam receiver and mirror may be used in the construction of a pipeline.

FIG. 3 shows how a canal building laser device 15 is to be erected in a shaft 16 and a laser beam receiver 17 at the other end of the pipeline 9 in the region of a still open pit 18.

The invention is not restricted to the above-described embodiment but modifications and variations may be made without departing from the spirit and scope of the invention as defined by the appended claims.

I claim:

1. In a levelling device including a canal building laser source and a laser beam receiver, wherein said receiver includes a transparent member for receiving a laser beam from the laser source and for displaying the laser beam as a light spot, the improvement comprising an independent laser source which is adapted to be mounted at one end of a pipe, the laser beam receiver having a base element adapted to be mounted adjacent an opposite end of the pipe remote from the laser source, the transparent member being mounted on the base element, wherein the laser beam receiver further includes a mirror arrangement including a mirror disposed on a side of the transparent member remote from the laser source, wherein the mirror is positioned externally of the pipe and is inclined relative to the laser beam such that the light spot formed by the laser beam on a surface of the transparent member facing away from the laser source is reflected by the mirror for viewing by an observer positioned remote from the mirror and offset laterally relative to the laser beam.

2. A laser beam levelling device as claimed in claim 1, wherein the base element carrying the transparent member has openings, a U-shaped mounting member having a pair of arms including ends extending into said openings and having an upwardly bent portion, and fastening clips carded on the upwardly bent portion for pivotally and detachably connecting the mirror to said upwardly bent portion so that a reflective surface of the mirror is disposed on the laser beam axis to receive a reflection from the transparent member, the reflection including a light spot formed by the laser beam on a surface of the transparent member facing away from the laser source, wherein the light spot is visible in the mirror at a position remote from the mirror and offset laterally relative to the laser beam.

3. In a levelling device for positioning a pipe at a desired inclination and direction relative to a reference point, the device including a laser source positioned at one end of the pipe and a laser beam receiver spaced from the laser source and positioned adjacent the opposite end of the pipe, wherein the laser beam receiver includes a transparent member having a surface for receiving a laser beam from the laser source and for displaying the laser beam as a light spot on the surface of the receiver, the transparent member including target indicia for defining a target relative to which the adjacent pipe end is to be oriented, the improvement comprising a base member including feet for positioning the base member within the pipe, wherein the transparent member is carried by the base member to extend across the path of the laser beam, a holder supported by the base member for holding a mirror in spaced relationship from the transparent member and on the opposite side of the transparent member from the side facing the laser source, wherein the mirror is positioned externally of the pipe and is inclined relative to the axis of the laser beam to reflect the image of the opposite side of the transparent member to an observer positioned laterally relative to the laser beam axis for ease of viewing of the laser beam spot and the target indicia at a position offset from the laser beam axis.

4. A levelling device as claimed in claim 3, wherein the base member is movable within the pipe and is supported by the inner surface of the pipe.

5. A levelling device as claimed in claim 3, wherein the mirror is pivotable about an axis that extends transversely relative to the laser beam axis.

6. A levelling device as claimed in claim 3, wherein the base member includes pivot means for pivotally supporting the mirror for pivotal movement about an axis transverse to the laser beam axis.

7. A levelling device as claimed in claim 6, wherein the pivot means are carried by arms extending from the base member, and wherein the arms extend outwardly from the adjacent end of the pipe to support the mirror exteriorly of the pipe.

* * * * *